June 24, 1930.  J. M. HALL  1,766,336
SHOCK ABSORBER
Filed March 22, 1927  4 Sheets-Sheet 1
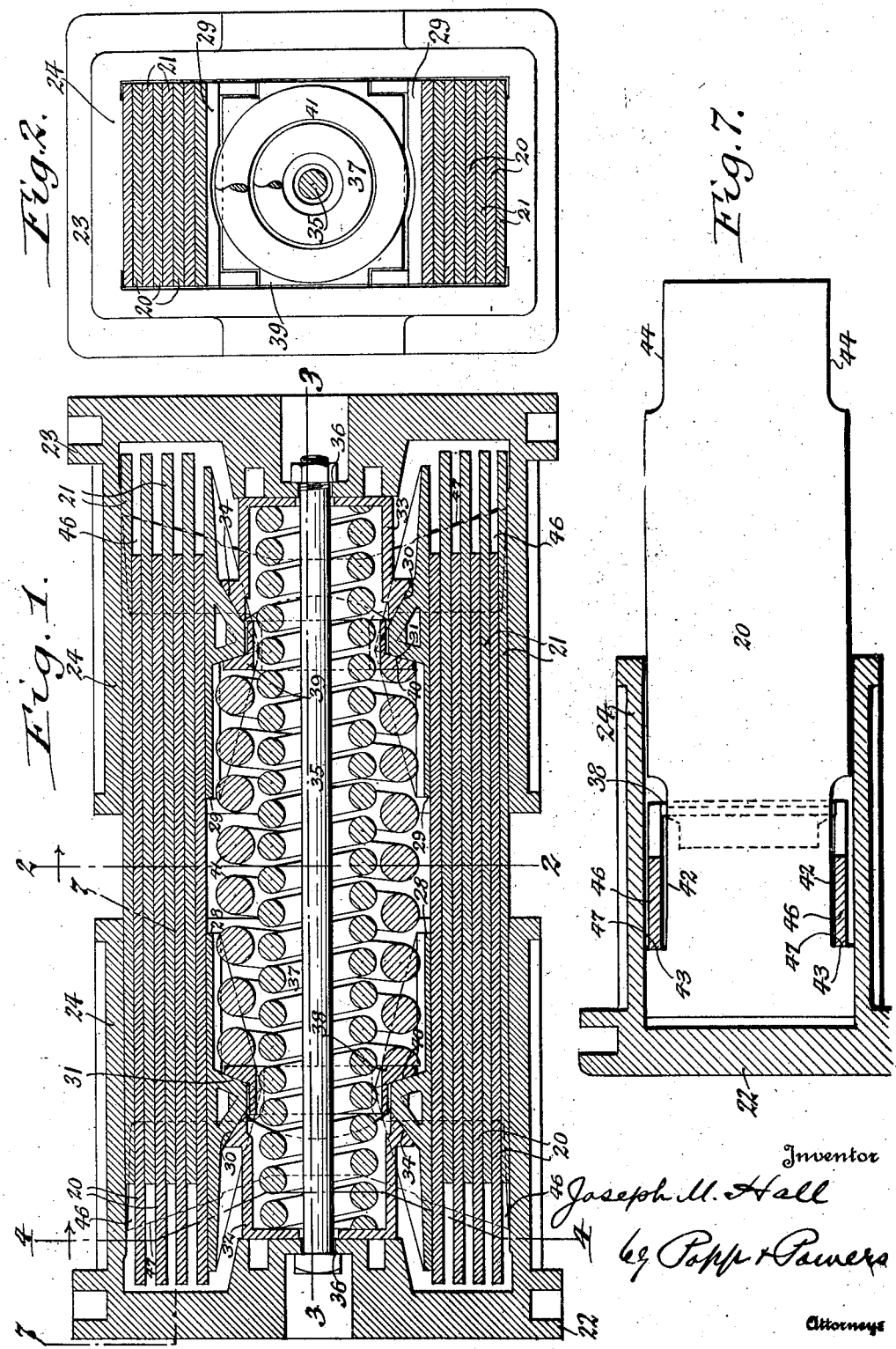
Inventor
Joseph M. Hall
by Popp & Powers
Attorneys June 24, 1930.  J. M. HALL  1,766,336
SHOCK ABSORBER
Filed March 22, 1927    4 Sheets-Sheet 2

Inventor
Joseph M. Hall,
By Popp & Powers
Attorneys

June 24, 1930.  J. M. HALL  1,766,336
SHOCK ABSORBER
Filed March 22, 1927   4 Sheets-Sheet 3
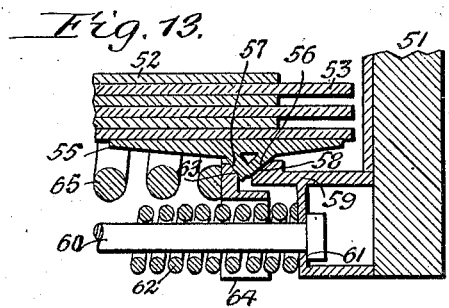
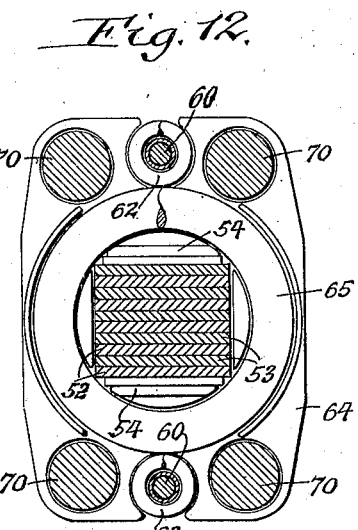
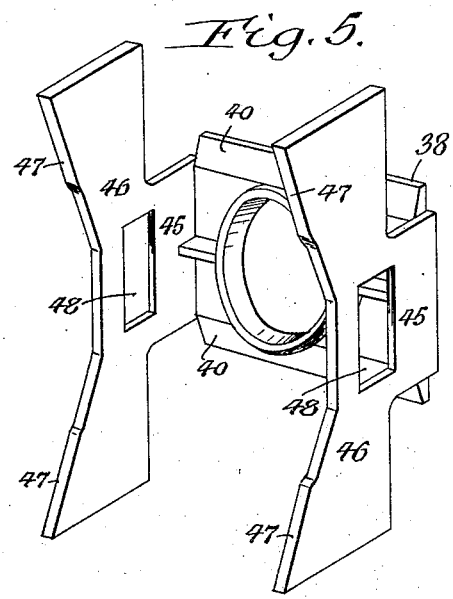
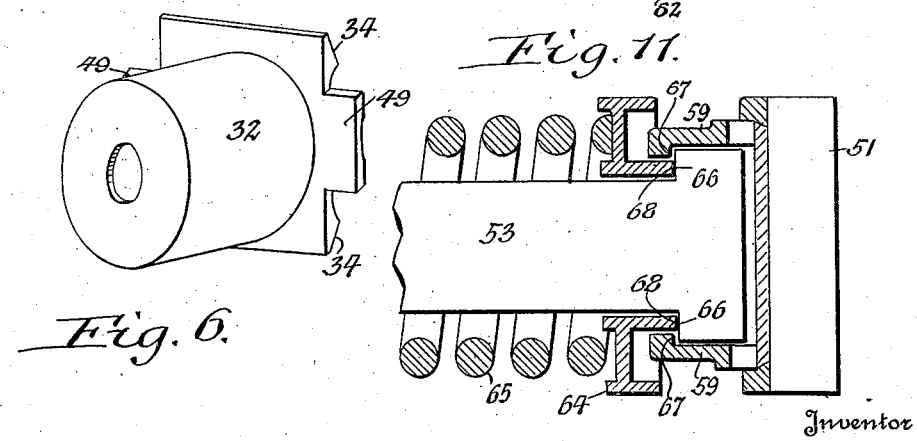
Inventor
Joseph M. Hall
By Popp & Powers
Attorneys

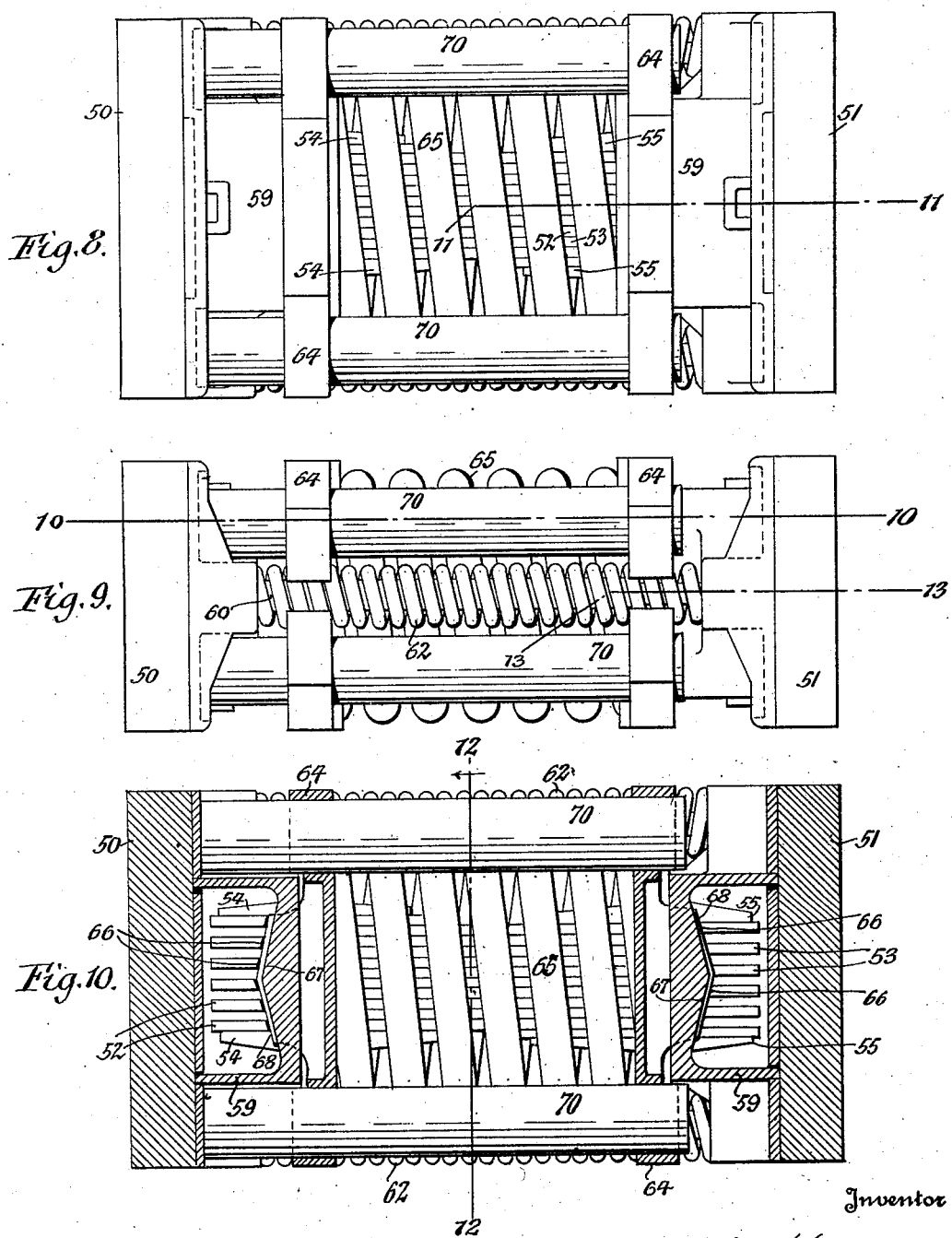

Patented June 24, 1930

1,766,336

UNITED STATES PATENT OFFICE

JOSEPH M. HALL, OF HAMILTON, ONTARIO, CANADA, ASSIGNOR TO UNIVERSAL DRAFT GEAR ATTACHMENT CO., OF CHICAGO, ILLINOIS, A CORPORATION OF ILLINOIS

SHOCK ABSORBER

Application filed March 22, 1927. Serial No. 177,277.

This invention relates to that class of shock absorbers which contain a plurality of sets of intercalated friction plates adapted to slide lengthwise relatively to one another and thereby absorb the shock of the load due to the frictional resistance offered by the co-operating friction plates. It has been found that when these plates are pressed together during closing of the shock absorber, by means of a lateral wedge pressure transmission or otherwise, in order to increase the frictional resistance offered to the load, their plates in some cases cling to one another so tightly that the same do not let go their grip sufficiently prompt to permit of an easy and quick release of the gear after the load has been removed.

It is the object of this invention to provide means for aiding in separating the friction plates upon removal of the load and thus permit the absorber to return promptly to release or open position.

Figure 3:
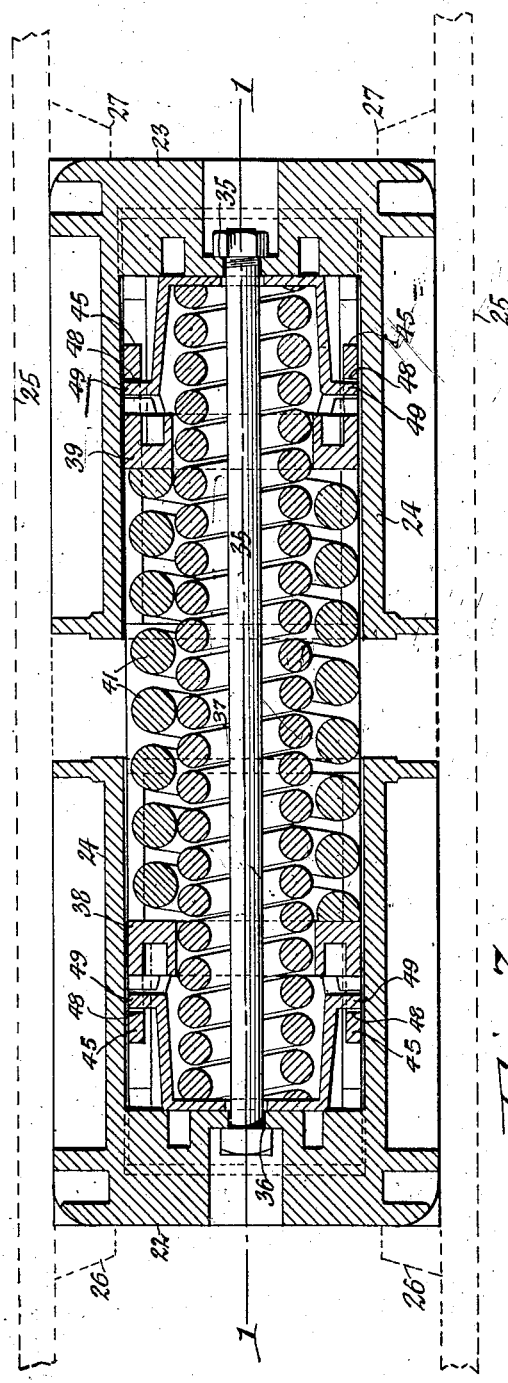
Figure 4:
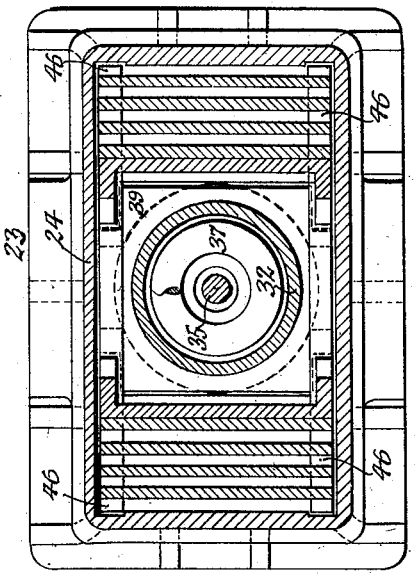

In the accompanying drawings:

Figure 1 is a vertical longitudinal section of a shock absorber taken on line 1—1, Fig. 3, and showing the parts in an open or release position. Figure 2 is a vertical transverse section taken on line 2—2, Fig. 1. Figure 3 is a horizontal section taken on line 3—3, Fig. 1. Figure 4 is a cross section taken on line 4—4, Fig. 1. Figure 5 is a perspective view of one of the releasing spring seats and the releasing wedges associated therewith. Figure 6 is a similar view of one of the wedge blocks. Figure 7 is a fragmentary longitudinal section taken on line 7—7, Fig. 1. Figure 8 is a side elevation of a form of shock absorber slightly different from that shown in Figs. 1-7, but embodying my improvements. Figure 9 is a top plan view of the same. Figure 10 is a horizontal section taken on line 10—10, Fig. 9. Figure 11 is a fragmentary longitudinal section taken on line 11—11, Fig. 8. Figure 12 is a cross section taken on line 12—12, Fig. 10. Figure 13 is a fragmentary longitudinal section taken on line 13—13 Fig. 9.

Similar characters of reference indicate like parts in the several views of the drawings:

Referring to the structure shown in Figs. 1-7, the numerals 20, 21, represent two groups of friction plates which are arranged lengthwise on opposite ends of the longitudinal center of the absorber and each group consisting of two sets of friction plates which are movable lengthwise relatively to one another.

At opposite ends of these plates are arranged two followers 22, 23, which are movable relatively to each other and each of which is adapted to engage the outer ends of the corresponding sets of both of said groups and has a tubular housing or side wall 24 which engages with the outer longitudinal sides of the adjacent outermost friction plates and supports the same against lateral outward pressure. This shock absorber is mounted on a car in the usual way by arranging the same between longitudinal sills 25, 25, and front and rear stops 26, 27, on the inner sides of the sills. In the following description it will be assumed that the follower 22 is at the front and the follower 23 is at the rear of the absorber when installed and when a buffing action occurs the front follower 22 will move backwardly and inwardly toward the rear follower 23 while the latter is resting against the rear stop 27, and when a pulling action occurs the rear follower 23 moves inwardly and forwardly toward the front follower 22 while the latter is resting immovable against the front stops 26.

At opposite ends of the inner longitudinal sides of the innermost friction plates the same are engaged by two pairs of shoes 28, 28, 29, 29, which are adapted to press laterally outward against the friction plates and cause the members of cooperating sets to engage tightly with each other and frictionally resist lengthwise movement of one set on another. Each of these shoes is provided with an outwardly facing incline 30 and an inwardly facing incline 31.

The numerals 32, 33 represent transverse wedge pressure creating means arranged between the front and rear ends of the two groups of friction plates and bearing at their outer ends against the inner sides of the front and rear followers and movable lengthwise therewith. Each of these pressure transmitting means is preferably constructed in the form of a hollow block and is provided at its inner end with inwardly converging inclines 34, which engage with the inwardly converging inclines 30 of the adjacent pair of pressure shoes. When the shock absorber is removed the two followers are held the proper distance apart to fit between the front and rear stops by means of a central longitudinal tie rod 35 passing through the wedge blocks and the followers and provided with inwardly facing shoulders 36 bearing against the outer sides of the followers, as shown in Figs. 1 and 3.

Surrounding the tie rod 35 and bearing at its opposite end against the bottom of the wedge blocks 32, 33 which practically form parts of the front and rear followers is a release spring 37 which constantly resists inward movement of the followers and the parts connected therewith.

The numerals 38, 39 represent front and rear spring seats which are arranged between the front and rear ends of the two groups of friction plates and each of which is provided with a central opening for the passage of the release spring and outwardly facing inclines 40 which engage by a wedge action with the inner inclines 31 on the adjacent pair of shoes. Arranged around the release spring within the space between the two groups of friction plates and bearing at its opposite ends against the inner sides of the spring seats is a main thrust spring 41 which is of greater capacity or strength than the release spring.

Adjacent to the outer end of each friction plate and at opposite edges thereof the same is provided with notches 42 forming inwardly facing shoulders 43 at the outer ends of these notches, and at the inner end each plate is reduced, as shown at 44 in Fig. 7.

Projecting outwardly from opposite edges of each of said spring seats are two longitudinal release bars or arms 45 preferably T-shaped, forming wings 46 which are arranged adjacent to the opposite edges of one end of the several sets of friction plates. The wings of each spring seat are arranged in the notches in the outer corresponding sets of friction plates of both groups and on opposite sides of the narrow inner parts of the other corresponding sets of both groups. Each of the wings has an inclined outer edge 47, the inclines of the two wings of each release arm or bar diverging outwardly and engaging with the inwardly facing shoulders 43 on the corresponding outer longitudinal edge portions of the companion sets of friction plates on one side of the shock absorber. Each of the releasing bars or arms is provided with a coupling opening 48 which receives a coupling lug 49 projecting laterally from the inner end of the adjacent wedge block or lateral pressure creating member, as shown in Fig. 3.

*Operation.*—Assuming that a buffing load is imposed on the shock absorber the first effect is that the front follower moves inwardly independently until it engages the outer ends of front sets of plates 20 of both groups during which time the front wedge block 32 by its wedge action on the front shoes causes the latter to be spread and produces an increased tightness in the frictional engagement of the several friction plates with each other. The several friction plates now move rearwardly together until the outer ends of the rear sets of friction plates engage with the rear follower and are thereby held at rest. During this time the releasing spring is put under increased compression and absorbs part of the load. The main thrust spring is also put under increased compression and not only absorbs some of the load but transmits pressure to the rear shoes which latter due to the wedging engagement with the rear spring seat and the rear wedge block are pressed laterally outward and increase the frictional engagement between the frictional plates at the rear ends thereof. As the front follower and front sets of friction plates continue their backward movement the latter slide between the rear sets of friction plates while the same are pressed together with progressively increasing tightness and thus offer increasing resistance, which takes up the shock gradually. While the rear sets of friction plates are thus moved rearwardly against the rear follower the shoulders 43 of the rear friction plates are carried rearwardly away from the release bar wings inasmuch as the latter cannot follow the rear plates to the same extent.

Upon removing the buffing load the releasing spring 37 first pushes the front follower away from the front ends of the front plates and the front wedge block outwardly away from the corresponding shoes which relieves the transverse pressure of the latter against the front ends of the friction plates and thus permits the resilience of the main spring to push the front spring seat and front shoes forwardly. As the front spring seat is moved forwardly by the main spring the wings of the releasing arms on this spring seat engage with the shoulders 43 on the front friction plates and draw the same forwardly to the end of the opening movement of the absorber. During the first part of this forward movement of the front friction plates the same also drag the rear friction plates forwardly until the shoulders 43 of the rear friction plates engage the wings of the rear release bars on the rear spring seat and thereafter the front friction plates slide forwardly on the rear friction plates under reduced frictional resistance so as to effect an easy but quick release of the absorber.

If for any reason the plates should stick when the load is removed the front and rear plates will be pulled apart by coupling lugs 49 on the front wedge block engaging with the front edges of the openings 48 in the release bars, thereby insuring restoration of the plates to normal position after each closing operation of the gear.

When the absorber is subjected to a pulling action the operation of closing and opening the the parts is exactly the same as previously described with the exception that the action is reversed.

Inasmuch as the main thrust spring exerts a constant pressure on the spring seats during release of the gear and the shoes have a wedging engagement with the spring seats and wedge blocks a sufficient frictional engagement would at times exist between the several friction plates and produce an objectionable retardation in the releasing operation of the gear, in the absence of any provision to counteract this condition. This is accomplished in the present case by means of the inclines 47 on the outer edges of the release bar wings which inclines upon engaging with the shoulders 43 of the friction plates during release operate to spread the friction plates of the several sets from each other and away from the walls or housing by a wedge or cam action, thereby reducing the frictional engagement between the several plates and permitting the corresponding plates of each set to be freely moved outwardly from the corresponding plates of the companion set and insuring a prompt and positive release of gear upon removal of the load.

If desired, this invention may be embodied in a shock absorber in which the friction plates are subjected to transverse inward pressure, such an application of the same being shown in Figs. 8–13, in which the parts are organized as follows:

The numerals 50, 51 represent front and rear followers and 52, 53 front and rear sets of intercalated friction plates adapted to slide lengthwise relatively to one another and to be engaged at their outer ends by said front and rear followers. On opposite sides and at opposite ends the friction plates are engaged by front and rear pressure shoes 54, 55, each of which has an outer incline 56 and an inner incline 57. The outer inclines of the corresponding shoes at each end of the friction plates are engaged by the inclines 58 on transverse pressure transmitting members or blocks 59 engaging with the inner sides of the followers and moving lengthwise therewith. The two wedge blocks 59 are connected by longitudinal tie rods 60 having shoulders 61 bearing against the outer sides of these blocks and these blocks and the followers are yieldingly held apart by releasing springs 62 surrounding these rods and interposed between the wedge blocks.

The inner inclines of the shoes are engaged by inclines 63 on spring seats 64 which latter are forced outwardly by a main thrust spring 65 interposed between the same and surrounding the friction plates.

Each of the friction plates is provided on the outer ends of the opposite edges with inwardly facing shoulders 66 and the adjacent wedge block is provided with outwardly facing shoulders 67 adapted to co-operate with the shoulders of the friction plates.

Each of the spring seats is provided on its opposite sides with outwardly facing shoulders 68 adapted to engage the shoulders of the adjacent friction plates. The shoulders 68 of each spring seat are V-shaped and inclined from the center of the gear outwardly, the shoulders 67 of each wedge block are of corresponding V-shape and the shoulders 66 of the several plates of each set are arranged progressively nearer the outer end of the plates from the center of the group or column of plates toward opposite sides of the same so that the several shoulders of each set of plates form a V-shaped line.

During a buffing or pulling load exerted upon the absorber one follower is moved inwardly toward the other, a transverse pressure of the shoes is first produced upon the plates and then one set of plates is moved lengthwise inward relative to the other set of plates, under increased frictional resistance in substantially the same manner as has been described with reference to the structure shown in Figs. 1–7. The release of the gear is also effected in substantially the same manner inasmuch as the shoulders 68 of the spring seats engage with the shoulders 66 of the friction plates and pull the latter lengthwise apart by motion derived from the resilience of the main thrust spring.

As the shoulders 68 are of V-shape and the shoulders 66 of each set of plates together form V-shaped lines it follows that the spring seats while acting to pull the plates lengthwise apart will at the same time spread the same by a wedge action and thereby reduce the frictional adhesion between the same and permit of pulling the plates lengthwise apart with greater ease.

If the plates should still stick the V-shaped shoulders 67 of the wedge blocks during the last part of the outward movement of the moving follower will engage the shoulders 66 of the friction plates and force them into their normal lengthwise separated position.

It will now be apparent that in both structures shown lateral spreading of the plates during release is secured and that prompt opening of the gear is therefore obtained.

For the purpose of taking the oversolid loads when the absorber is closed the maximum extent, a plurality of longtiudinal stop rods 70 may be employed which are preferably mounted loosely in openings in the marginal parts of the spring seats and are adapted to be engaged at their opposite ends by the inner sides of the main followers.

I claim as my invention:

1. A friction draft gear comprising a plurality of sets of intercalated friction plates adapted to slide lengthwise relatively to one another, each of said plates having shoulders on the side edges thereof at one end only, means for moving said plates lengthwise relative to each other when subjected to a shock, means at each end of said gear for pressing said plates together laterally when subjected to a shock, a spring resistance, and means engaging said shoulders for laterally separating said plates during the release movement of said gear.

2. A shock absorber comprising a plurality of sets of intercalated friction plates adapted to slide lengthwise relatively to one another, means for moving said plates lengthwise relatively to each other when subjected to a shock, means including friction shoes for pressing said plates together laterally when subjected to a shock, a spring resistance, and wedging means engaging said plates for spreading the same laterally during the release movement of said gear.

3. A shock absorber comprising a plurality of sets of intercalated friction plates adapted to slide lengthwise relatively to one another, followers movable relatively to each other and adapted to engage the outer ends of said sets of plates, respectively, shoes bearing against the sides of said sets of plates, lateral pressure creating means moving with said followers and having wedging engagement with said shoes for pressing the same against said plates, spring releasing means interposed between said followers, spring seats bearing outwardly against said shoes, a main spring resistance interposed between said spring seats, and releasing members arranged on said spring seats and having wedging engagement with said friction plates.

4. A shock absorber comprising a plurality of sets of intercalated friction plates adapted to slide lengthwise relatively to one another, followers movable relatively to each other and adapted to engage the outer ends of said sets of plates, respectively, shoes bearing against the sides of said sets of plates, lateral pressure creating means moving with said followers and having wedging engagement with said shoes for pressing the same against said plates, spring releasing means interposed between said followers, spring seats bearing outwardly against said shoes, a main spring resistance interposed between said spring seats, and releasing members arranged on said spring seats and having wedging engagement with said friction plates, and also adapted to be engaged with said lateral pressure creating means.

5. A shock absorber comprising a plurality of groups of friction plates arranged on opposite sides of the longitudinal center of the absorber and each group consisting of two sets of friction plates which are intercalated and are slidable lengthwise relatively to one another, relatively movable housings having followers adapted to engage the outer ends of said sets of plates, respectively, and having side walls adapted to be engaged by and support the outer longitudinal sides of the outermost friction plates of both groups, said friction plates being provided at their outer ends with inwardly facing shoulders, shoes engaging with the inner longitudinal sides of the innermost plates of both groups, transverse pressure creating means moving with said followers and having inward wedging engagement with said shoes, releasing spring means interposed between said followers, spring seats having outward engagement with said shoes, a main spring resistance interposed between said spring seats, and arms arranged on said spring seats and having wedge faces engaging with the inwardly facing shoulders of said friction plates.

6. A shock absorber comprising a plurality of groups of friction plates arranged on opposite sides of the longitudinal center of the absorber and each group consisting of two sets of friction plates which are intercalated and are slidable lengthwise relatively to one another, relatively movable housings having followers adapted to engage the outer ends of said sets of plates, respectively, and having side walls adapted to be engaged by and support the outer longitudinal sides of the outermost friction plates of both groups, said friction plates being provided at their outer ends with inwardly facing shoulders, shoes engaging with the inner longitudinal sides of the innermost plates of both groups, transverse pressure creating means moving with said followers and having inward wedging engagement with said shoes, releasing spring means interposed between said followers, spring seats having outward engagement with said shoes, a main spring resistance interposed between said spring seats, and pairs of arms projecting from opposite sides of said spring seats and arranged on opposite sides of said groups of plates and having wedge shaped edges engaging with the inwardly facing shoulders of said plates.

7. A shock absorber comprising a plurality of groups of friction plates arranged on opposite sides of the longitudinal center of the absorber and each group consisting of two sets of friction plates which are intercalated and are slidable lengthwise relatively to one another, relatively movable housings having followers adapted to engage the outer ends of said sets of plates, respectively, and having side walls adapted to be engaged by and support the outer longitudinal sides of the outermost friction plates of both groups, said friction plates being provided at their outer ends with inwardly facing shoulders, shoes engaging with the inner longitudinal sides of the innermost plates of both groups, transverse pressure creating means moving with said followers and having inward wedging engagement with said shoes, releasing spring means interposed between said followers, spring seats having outward engagement with said shoes, a main spring resistance interposed between said spring seats, and arms arranged on said spring seats and having wedge faces engaging with the inwardly facing shoulders of said friction plates, arms arranged on said spring seats and having wedge shaped edges engaging with said inwardly facing shoulders of said plates and also provided with coupling openings, and coupling lugs arranged on said lateral wedge pressure creating means and projecting into said coupling openings.

In testimony whereof I affix my signature.

JOSEPH M. HALL.